(12) United States Patent
Fujiwara

(10) Patent No.: US 8,793,098 B2
(45) Date of Patent: Jul. 29, 2014

(54) MOVEMENT DETECTION DEVICE, ELECTRONIC DEVICE, MOVEMENT DETECTION METHOD AND COMPUTER READABLE MEDIUM

(75) Inventor: Kazunori Fujiwara, Tokyo (JP)

(73) Assignee: Lapis Semiconductor Co., Ltd., Yokohama (JP)

( * ) Notice: Subject to any disclaimer, the term of this patent is extended or adjusted under 35 U.S.C. 154(b) by 353 days.

(21) Appl. No.: 12/929,842

(22) Filed: Feb. 18, 2011

(65) Prior Publication Data

US 2011/0208472 A1 Aug. 25, 2011

(30) Foreign Application Priority Data

Feb. 22, 2010 (JP) ................................ 2010-036275

(51) Int. Cl.
*G06F 19/00* (2011.01)
(52) U.S. Cl.
USPC ........................................... 702/141; 73/488
(58) Field of Classification Search
USPC ................... 702/141, 160, 150, 153; 345/156
See application file for complete search history.

(56) References Cited

U.S. PATENT DOCUMENTS

| | | | | |
|---|---|---|---|---|
| 6,636,826 B1 * | 10/2003 | Abe et al. | ...................... | 702/151 |
| 2006/0017692 A1 * | 1/2006 | Wehrenberg et al. | ......... | 345/156 |
| 2007/0118241 A1 * | 5/2007 | Rosenberg | ...................... | 700/94 |
| 2007/0145680 A1 * | 6/2007 | Rosenberg | ................ | 273/138.1 |
| 2009/0307633 A1 * | 12/2009 | Haughay et al. | .............. | 715/841 |
| 2010/0033422 A1 * | 2/2010 | Mucignat et al. | ............. | 345/156 |
| 2010/0192662 A1 * | 8/2010 | Yanni | .............................. | 73/1.38 |
| 2011/0025901 A1 * | 2/2011 | Tsubusaki | ................ | 348/333.12 |

FOREIGN PATENT DOCUMENTS

JP 2009-033651 A 2/2009

* cited by examiner

*Primary Examiner* — Sujoy Kundu
*Assistant Examiner* — Corey Bailey
(74) *Attorney, Agent, or Firm* — Rabin & Berdo, P.C.

(57) ABSTRACT

Three-axis acceleration component data from an acceleration sensor is split into three stationary components and three movement components. The axial direction of movement is detected based on the movement component having the maximum value. A shake duration is detected based on a time period from when this maximum movement component exceeded a an upper limit value of a specific range until it once again reaches a value in the specific range after falling below a lower limit value, or on a time period from when the movement component fell below the lower threshold value until it once again reaches the specific range after exceeding the upper threshold value. The magnitude of movement is determined by comparing the shake duration to a certain period, or by comparing the vector integral value over the shake duration to a certain threshold value.

12 Claims, 17 Drawing Sheets

MOVEMENT DETECTION DEVICE, ELECTRONIC DEVICE, MOVEMENT DETECTION METHOD AND COMPUTER READABLE MEDIUM

CROSS-REFERENCE TO RELATED APPLICATION

This application claims priority under 35 USC 119 from Japanese Patent Application No. 2010-036275 filed on Feb. 22, 2010, the disclosure of which is incorporated by reference herein.

BACKGROUND

1. Technical Field

The present invention relates to a movement detection device, an electronic device, a movement detection method, and a computer readable medium, and in particular to a movement detection device, an electronic device, a movement detection method, and computer readable medium for detecting movement using a tri-axial acceleration sensor.

2. Related Art

Conventionally, in an electronic device, such as a mobile phone or the like, a tri-axial acceleration sensor is internally provided, acceleration component data is detected for each axial direction of the tri-axial acceleration sensor, and computation is performed of the inclination angle of the electronic device.

There is, for example, a proposal for a mobile electronic device in which acceleration data is detected by an acceleration sensor provide internally to a mobile phone, the amount of inclination for each of three axes is computed and which of the faces of the mobile phone faces in which direction is ascertained with respect to the ground, the acceleration occurring when a particular face of the mobile phone is tapped is detected, determination is made as to whether or not the applied acceleration is a threshold value or greater, and the face to which force has been applied is computed (see, for example, JP-A No. 2009-33651).

SUMMARY

A first aspect of the present invention is a movement detection device including an acceleration detection section and a movement detection section. The acceleration detection section detects each respective acceleration component of acting acceleration for each axis of a three-dimensional orthogonal coordinate system and outputs respective acceleration component data. The movement detection section detects the axial direction in which the acceleration component has moved along the respective axes based on acceleration component data output from the acceleration detection section. For cases in which the acceleration component data in which of the axial directions exceeded an upper limit value of a specific range encompassing 0 before becoming less than a lower limit value of the specific range, the movement detection section detects the magnitude of movement based on a first time period from a point in time when the acceleration component data exceeded the upper limit value up to once again becoming a value in the specific range after becoming less than the lower limit value, or based on a first integral value of the magnitude of the acceleration component within the first time period. For cases in which the acceleration component exhibiting the maximum value became less than the lower limit value before exceeding the upper limit value, the movement detection section detects the magnitude of movement based on a second time period from a point in time when the acceleration component became less than the lower limit value up to once again becoming a value within the specific range after exceeding the upper limit value, or based on a second integral value of the magnitude of the acceleration component within the second time period.

A second aspect of the present invention is an electronic device including the movement detection device of the first aspect of the present invention. Application may be made, for example, to a mobile phone, controller for a game console or the like as the electronic device.

A third aspect of the present invention is a movement detection method including: detecting and outputting with an acceleration detection section each respective acceleration component of acceleration acting on the acceleration detection section for each axis of a three-dimensional orthogonal coordinate system; detects the axial direction in which the acceleration component has moved along the respective axes based on acceleration component data; for cases in which the acceleration component data of the detected axial direction exceeded an upper limit value of a specific range encompassing 0 before becoming less than a lower limit value of the specific range, detecting the magnitude of movement with a movement detection section based on a first time period from a point in time when the acceleration component data exceeded the upper limit value up to once again becoming a value in the specific range after becoming less than the lower limit value, or based on an integral value of the magnitude of the acceleration component within the first time period; and for cases in which the acceleration component exhibiting the maximum value became less than the lower limit value before exceeding the upper limit value, detecting the magnitude of movement with the movement detection section based on a second time period from a point in time when the acceleration component became less than the lower limit value up to once again becoming a value within the specific range after exceeding the upper limit value, or based on an integral value of the magnitude of the acceleration component within the second time period.

A fourth aspect of the present invention is a computer readable storage medium stored with a movement detection program that causes a computer to function as: an acquisition section that acquires respective acceleration component data output from an acceleration detection section that detects respective acceleration component of acting acceleration for each axis of a three-dimensional orthogonal coordinate system and outputs the respective acceleration component data; and a movement detection section that detects the axial direction in which the acceleration component has moved along the respective axes based on acceleration component data output from the acceleration detection section acquired by the acquisition section. For cases in which the acceleration component data in which of the axial directions exceeded an upper limit value of a specific range encompassing 0 before becoming less than a lower limit value of the specific range, detecting the magnitude of movement based on a first time period from a point in time when the acceleration component data exceeded the upper limit value up to once again becoming a value in the specific range after becoming less than the lower limit value, or based on an integral value of the magnitude of the acceleration component within the first time period. For cases in which the acceleration component exhibiting the maximum value became less than the lower limit value before exceeding the upper limit value, detecting the magnitude of movement based on a second time period from a point in time when the acceleration component became less than the lower limit value up to once again becoming a value within the specific range after exceeding the upper limit value, or based on an integral value of the magnitude of the acceleration component within the second time period.

BRIEF DESCRIPTION OF THE DRAWINGS

Exemplary embodiments of the present invention will be described in detail based on the following figures, wherein.

DETAILED DESCRIPTION

Detailed explanation follows regarding exemplary embodiments of the present invention, with reference to the drawings.

Figure 1:
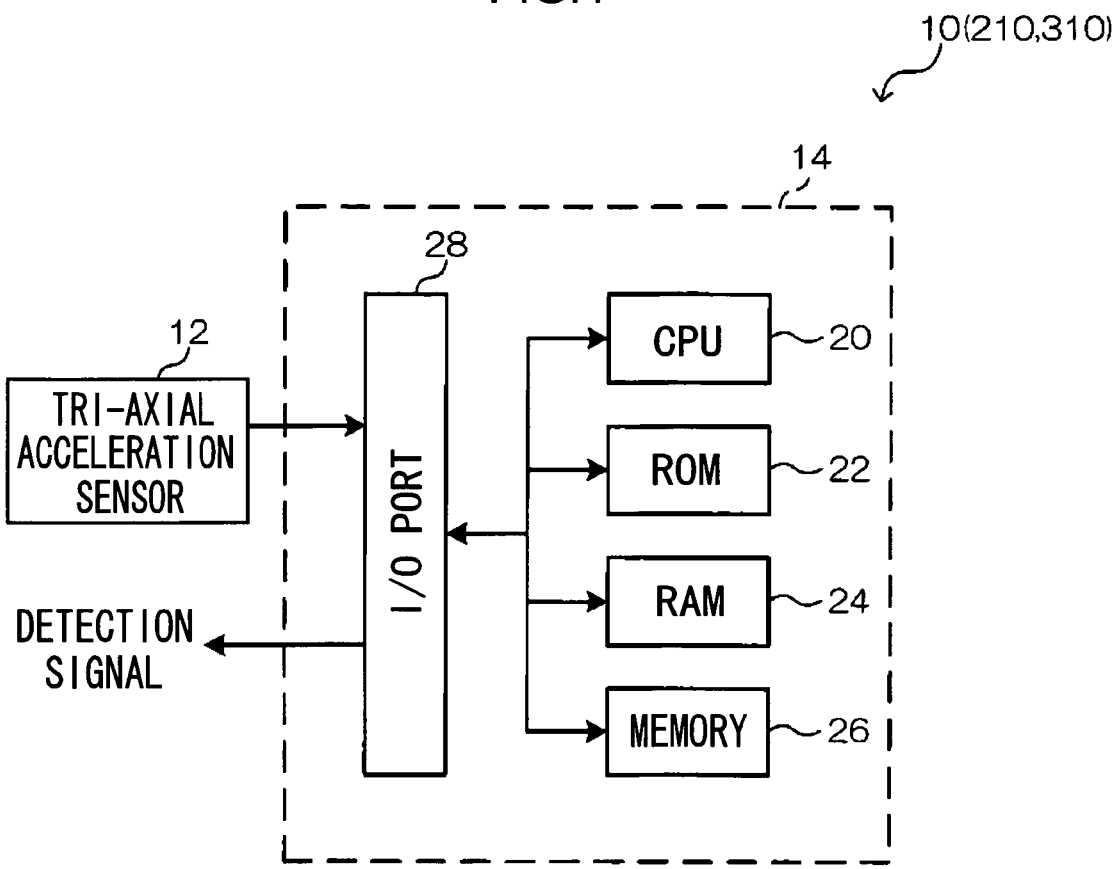
FIG. 1 is a block diagram showing a configuration of a movement detection device of a present exemplary embodiment.

As shown in FIG. 1, a movement detection device 10 of a first exemplary embodiment is equipped with a tri-axial acceleration sensor 12 that detects acceleration components in each axial direction of an X axis, a Y axis, and a Z axis in an orthogonal coordinate system, and outputs acceleration component data, and with a microcomputer 14 that detects in which axial direction the movement detection device 10 has moved and with what movement magnitude, and outputs a detection signal according to the detected axial direction and movement magnitude.

Figure 2:
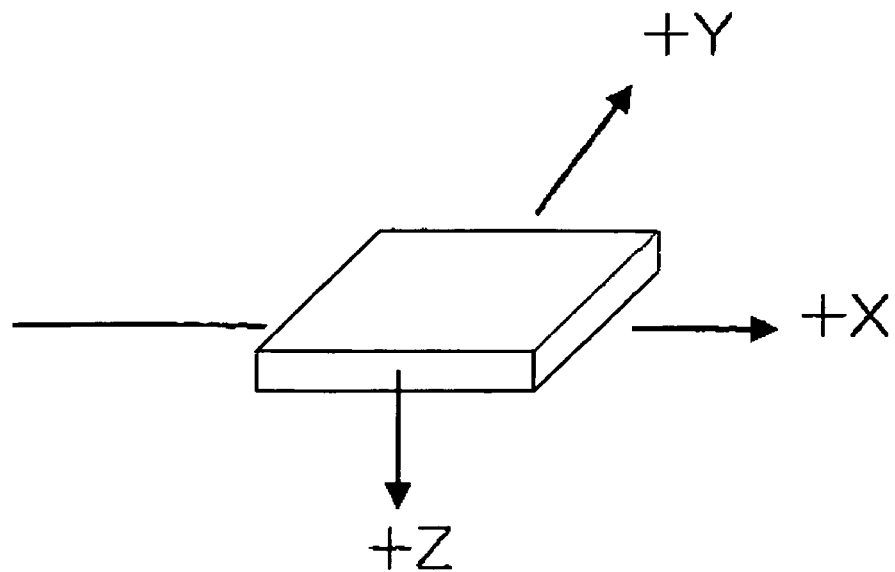
FIG. 2 is a perspective view showing the external appearance of a tri-axial acceleration sensor employed in a movement detection device of the present exemplary embodiment.

The tri-axial acceleration sensor 12 detects acceleration components in each axial direction of the X axis, the Y axis, and the Z axis in an orthogonal coordinate system, as shown in FIG. 2, and outputs acceleration component data. In the acceleration component data the direction of the acceleration component is expressed by the sign ("+" or "−") of the acceleration component data value, and the magnitude of the acceleration component is expressed by the absolute value of the acceleration component data value. The direction of the acceleration components is defined such that towards the right is "+" and towards the left is "−" for the X axis in FIG. 2. The direction into the page is "+" and the direction out of the page is "−" for the Y axis in FIG. 2. Downwards is "+" and upwards is "−" for the Z axis in FIG. 2. Accordingly, acceleration components can be detected in six directions, the X axis + direction, the X axis − direction, the Y axis + direction, the Y axis − direction, the Z axis + direction, and the Z axis − direction.

The tri-axial acceleration sensor 12, outputs acceleration component data of "0 g" for the X axis and the Y axis and outputs acceleration component data "+1 g" for the Z axis when in a stationary state with the orientation shown in FIG. 2. Note that "g" is gravitational acceleration, expressing the units of the acceleration component data.

The microcomputer 14 is configured including: a CPU 20 that controls the movement detection device 10 overall; ROM 22, serving as a storage medium on which various programs, such as, for example, a movement detection program, described below, are stored; RAM 24 serving as a work area for temporarily storing data; a memory 26 serving as a storage unit stored with various data; an input-output (I/O) port 28; and a bus connecting these all together. The tri-axial acceleration sensor 12 is connected at the I/O port 28.

Explanation now follows regarding the operation of the movement detection device 10 of the first exemplary embodiment. In the first exemplary embodiment, when the movement detection device 10 is moved along either one of the axial directions, the movement detection device 10 detects which axial direction it has been moved in and the movement magnitude. Note that in the first exemplary embodiment, shaking the movement detection device 10 in this manner along one of the axial directions of the tri-axial acceleration sensor 12 is referred to as a "snap shake".

Figure 3:
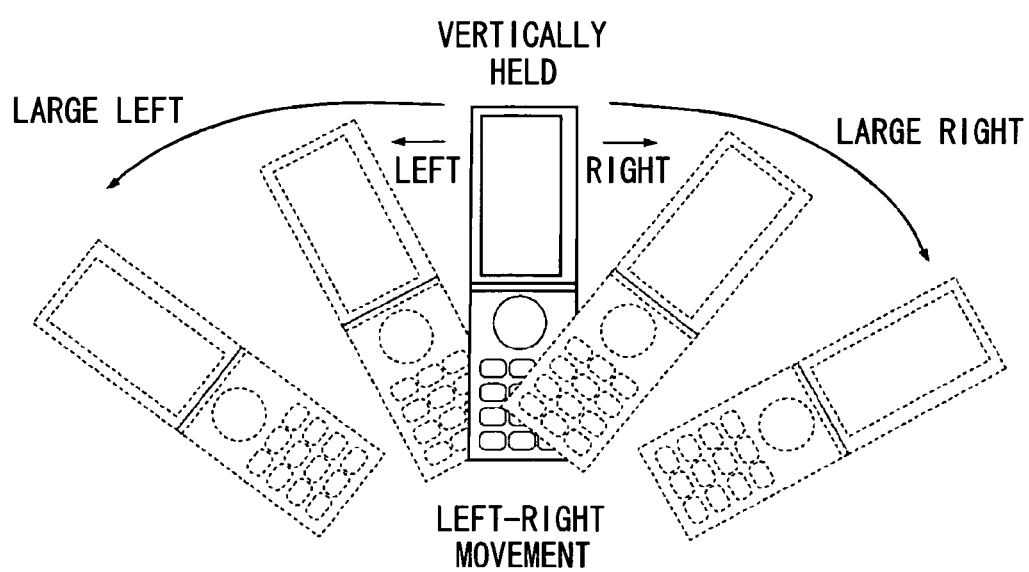
FIG. 3 is a diagram for explaining left-right movement of snap shake when vertically held.
Figure 4:
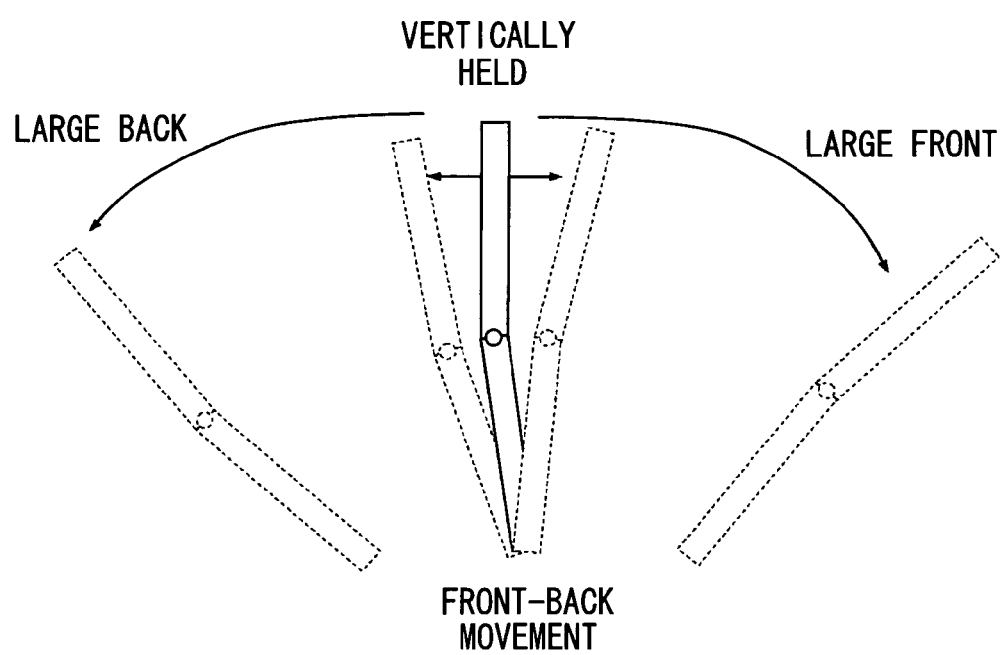
FIG. 4 is a diagram for explaining front-back movement of snap shake when vertically held.
Figure 5:
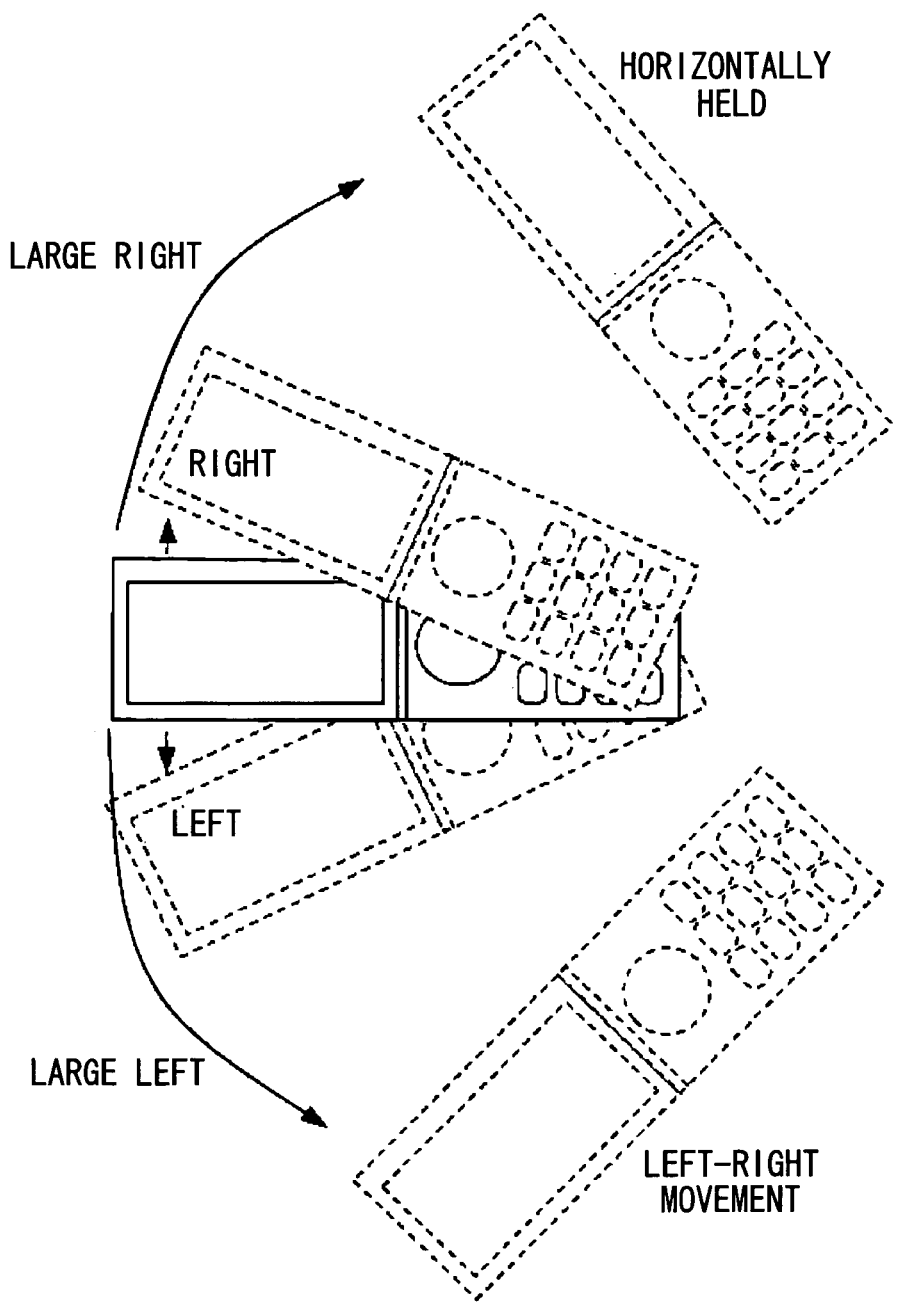
FIG. 5 is a diagram for explaining left-right movement of snap shake when horizontally held.
Figure 6:
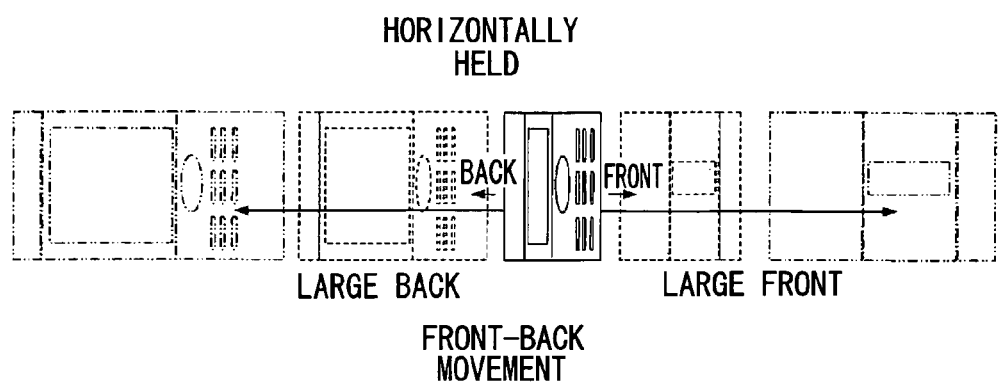
FIG. 6 is a diagram for explaining front-back movement of snap shake when horizontally held.
Figure 7:
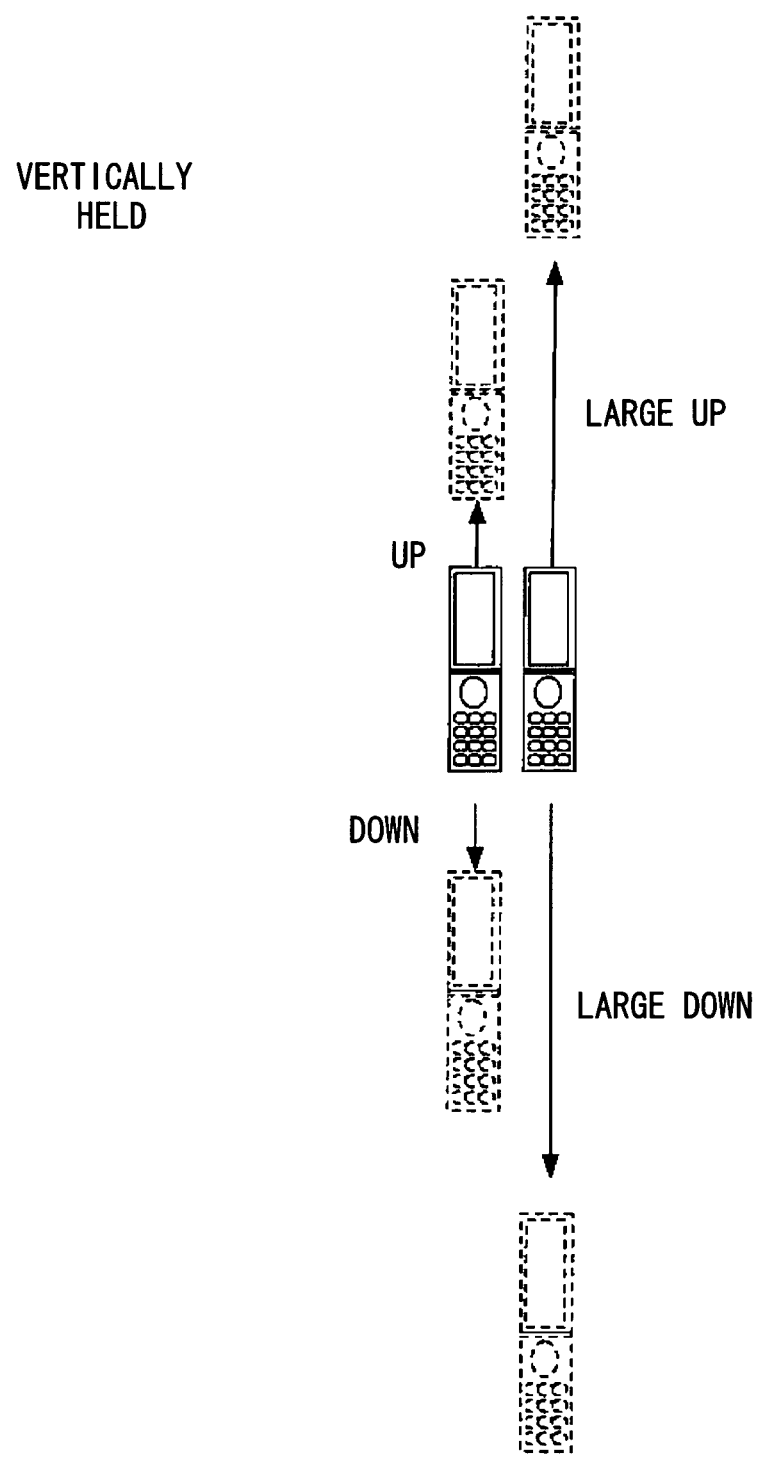
FIG. 7 is a diagram for explaining length direction movement of snap shake when vertically held.
Figure 8:
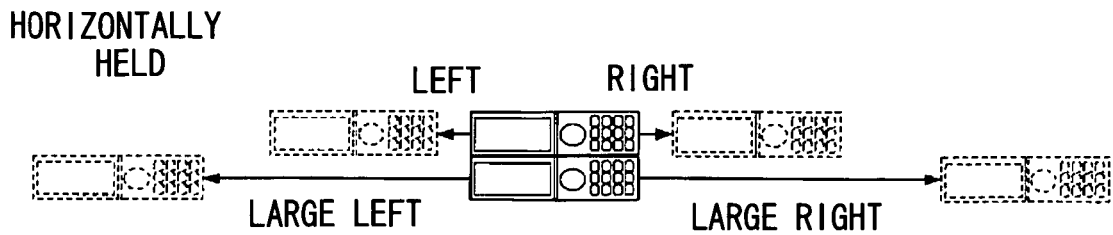
FIG. 8 is a diagram for explaining length direction movement of snap shake when horizontally held.

Explanation follows regarding snap shake of a mobile phone provided with the movement detection device 10 of the first exemplary embodiment, with reference to FIG. 3 to FIG. 8. FIG. 3 illustrates a snap shake in the left-right direction when the mobile phone is held in the vertical direction (vertically held). FIG. 4 illustrates a snap shake in the front-rear direction when vertically held. FIG. 5 illustrates a snap shake in the left-right direction when the mobile phone is held in a horizontal direction (horizontally held). FIG. 6 illustrates a snap shake in the front-rear direction when horizontally held. FIG. 7 illustrates a snap shake in the length direction when vertically held. FIG. 8 illustrates a snap shake in the length direction when horizontally held. In each of the cases, setting can be made for a small snap shake and a large snap shake for a snap shake in a given direction.

Figure 9:
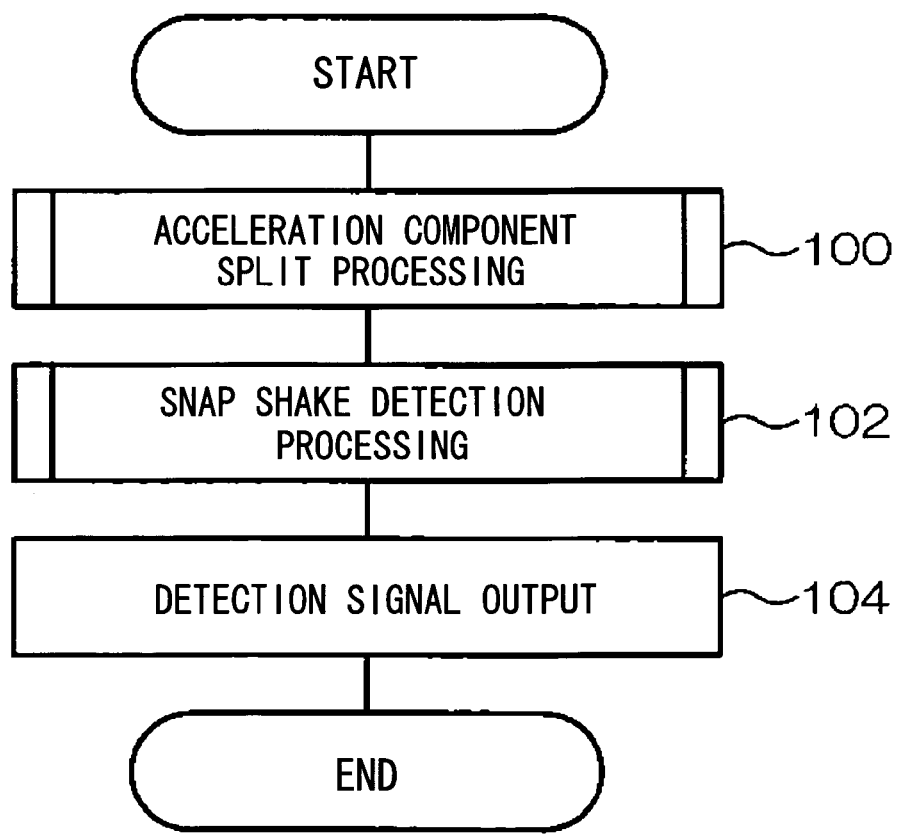
FIG. 9 is a flow chart showing contents of a movement detection processing routine in a movement detection device of a first exemplary embodiment.

Next, explanation follows regarding a movement detection processing routine in the movement detection device 10 of the first exemplary embodiment, with reference to FIG. 9. The current routine is performed by the CPU 20 executing a movement detection program stored on the ROM 22.

At step 100, acceleration component split processing is executed to split acceleration component data into a stationary component and a movement component. Explanation follows here regarding an acceleration component split processing routine, with reference to FIG. 10.

Figure 11:
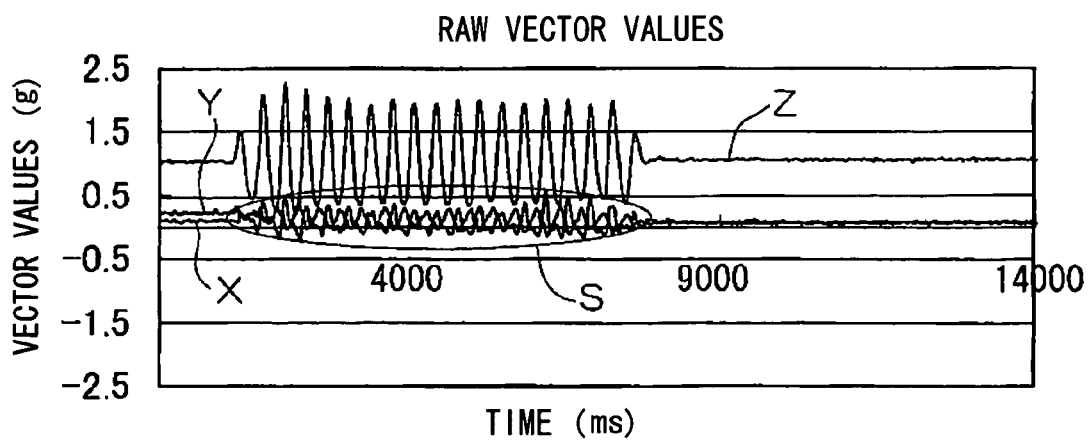
FIG. 11 is a diagram showing acceleration component data when a tri-axial acceleration sensor is moved plural times in the direction of gravity from a horizontal placement state.

At step 120, acceleration component data is acquired from the tri-axial acceleration sensor 12 for each of the axes. An example of acquired acceleration component data is shown in FIG. 11. It is necessary to detect in which of the axial directions the movement detection device 10 has been moved from this state, however, at the locations in the graph indicated by S (the outlined locations), there are plural points where the acceleration component data for each of the three axes indicates values of about the same level, and at these points it is sometimes difficult to detect in which axial direction the movement detection device 10 was moved.

Figure 12:
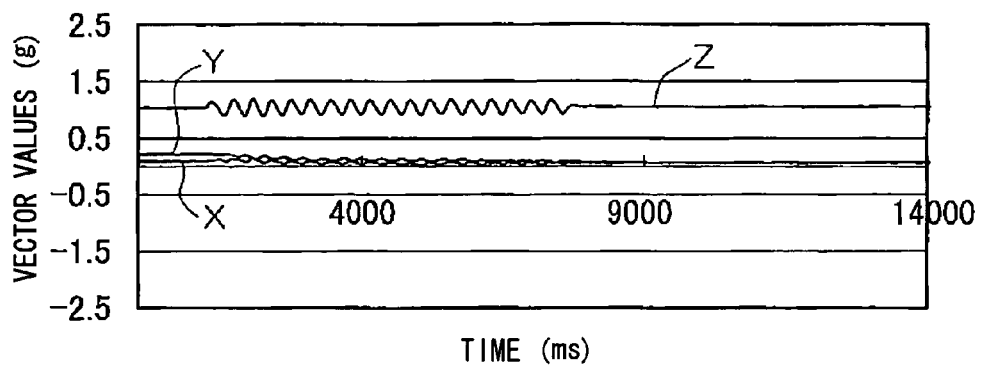
FIG. 12 is a diagram showing stationary components obtained by low-pass filtering processing on the acceleration component data of FIG. 11.

Therefore, the routine next proceeds to step 122, and low-pass filter processing is performed on each of the acquired acceleration component data. Data that has been subjected to low-pass filter processing is shown in FIG. 12. As shown in FIG. 12, the acceleration component data after low-pass filter processing can be completely separated into the X axis and the Y axis showing substantially "0 g", and the Z axis showing substantially "+1 g". In this manner, data extracted by subjecting the acquired acceleration component data to low-pass filter processing is referred to as the "stationary component" of the acceleration component data.

Figure 13:
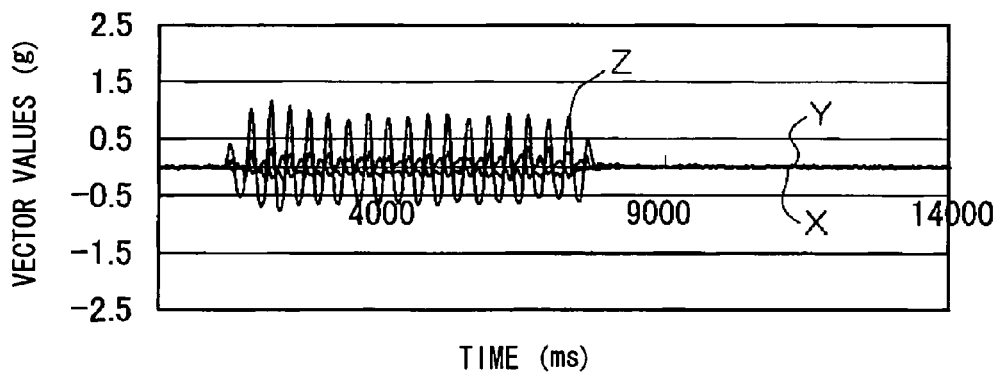
FIG. 13 is a diagram showing movement components obtained by subtracting the stationary components of FIG. 12 from the acceleration component data of FIG. 11.

Next, at step 124, data of the stationary component extracted in above step 122 is subtracted from the acceleration component data acquired at above step 120 for each of the X axis, Y axis, and Z axis, respectively. The data after subtraction is shown in FIG. 13. Data extracted in this manner by subtracting data after low-pass filter processing from the acquired acceleration component data is referred to as the "movement component" of the acceleration component data. The acceleration component data can be split with simple processing into stationary components and movement components by this method, without performing high precision high-pass filter processing.

Next, the routine returns to step 102 of FIG. 9, and snap shake detection processing is executed to detect a snap shake. Explanation follows here regarding a snap shake detection processing routine, with reference to FIG. 14.

At step 140, observation is commenced of a time series of movement component a, extracted in the acceleration component split processing (FIG. 10) of step 124, for each of the 3 axes.

Next, at step 142, determination is made as to whether or not the movement component of one of the axes has exceeded either a predetermined + direction threshold value Thu or a − direction threshold value Thd. The threshold value Thu is an upper limit value of a specific range, and the threshold value Thu is a lower limit value of the specific range. Note that "exceeded . . . a threshold value" refers to the value of movement component a becoming less than the threshold value Thd. The wave form of the movement component for a snap shake also differs depending, for example, on the installation position of the movement detection device 10 in the electronic device it is installed in, or the like, the threshold value Thu and the threshold value Thd are each made so as to be respectively separately settable in consideration of the installation position or the like. When one of the movement components a exceeds one of the threshold values the routine proceeds to step 144, and when none of the movement components a exceeds the threshold values determination of the current step is repeated.

Figure 15A:
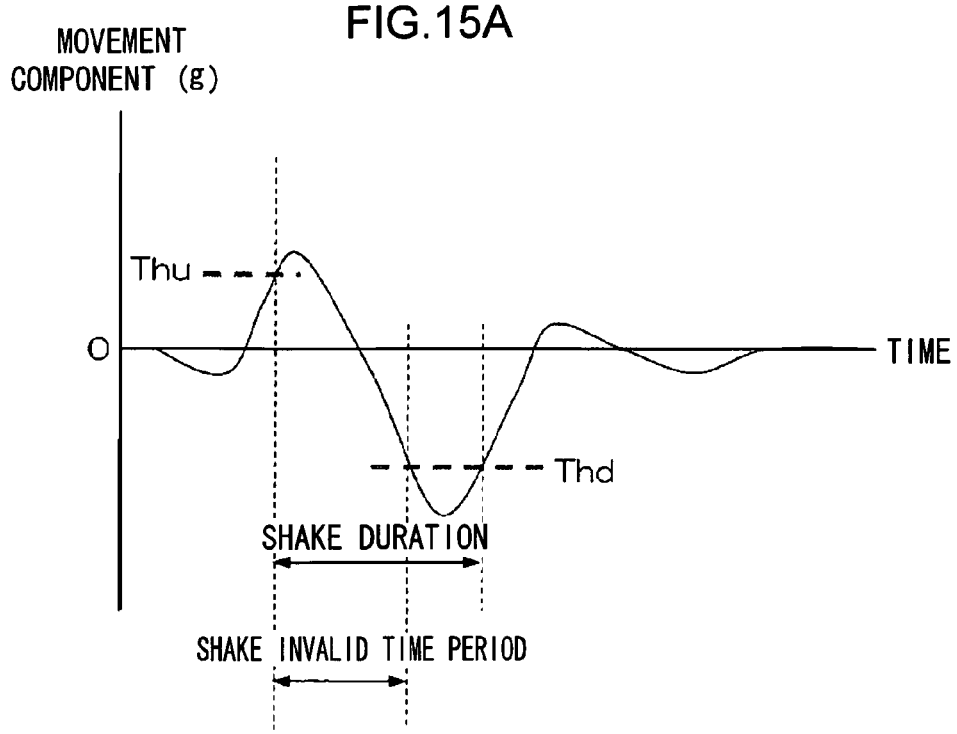
FIGS. 15A and 15B are diagrams for explaining detection of snap shake in the first exemplary embodiment when (FIG. 15A) the movement component has first exceeded the threshold value Thu, and when (FIG. 15B) the movement component has first become less than the threshold value Thd.
Figure 15B:
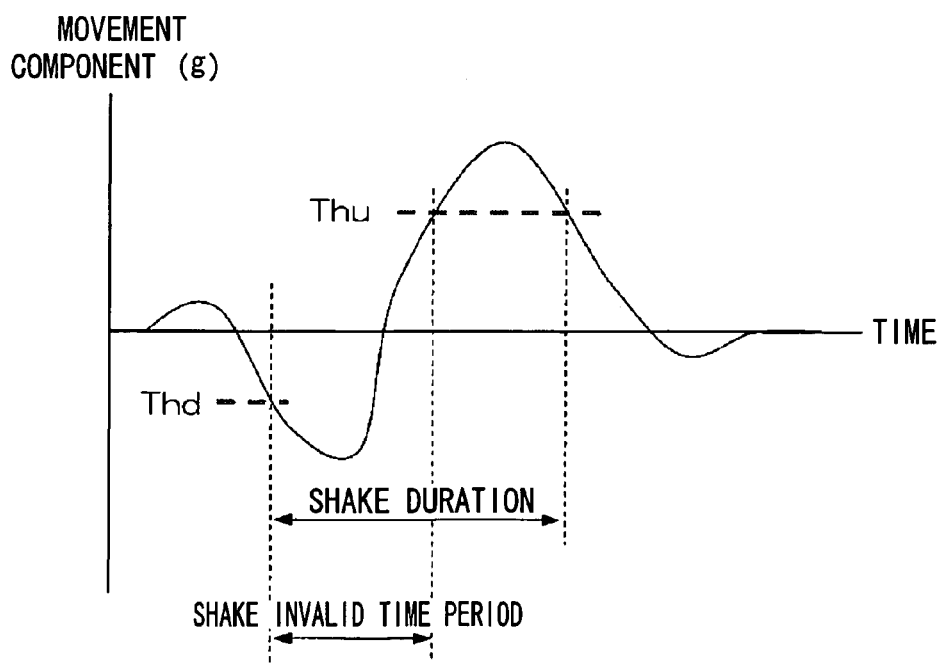

At step 144, determination is made that the movement detection device 10 was moved in the axial direction corresponding to the movement component a determined to have exceeded one of the threshold values at above step 142. Determination is also made as to whether it was moved in the + direction or − direction of the axial direction, by which of the threshold values was first exceeded. As shown in FIG. 15A, when the movement component a first exceeded the threshold value Thu the movement is determined to have been in the + direction, and, as shown in FIG. 15B, when the threshold value Thd was first exceeded the movement is determined to have been in the − direction. More specifically, if the movement component $a_z$ in the Z axis exceeded the threshold value before the movement component $a_x$ in the X axis and the movement component $a_y$ in the Y axis, and the threshold value that was exceeded is the threshold value Thu, then the direction of movement is determined to have been in the Z axis + direction.

Next, at step 146, determination is made as to whether or not, after a specific time period Δt1 from when the movement component a exceeded either the threshold value Thu or the threshold value Thd at above step 142, the opposite threshold value was exceeded from the threshold value Thu or the threshold value Thd to that exceeded the previous time. Namely, when the movement component a exceeded the threshold value Thu at the above step 142, determination is made as to whether or not the threshold value Thd was exceeded after the Δt1. When the movement component a exceeded the threshold value Thd in above step 142, determination is made as to whether or not the threshold value Thu was exceeded after the Δt1. Note that Δt1 is a shake invalid time period for preventing incorrect determination, and is a specific time period such that a snap shake is not detected when the time period from exceeding one of the threshold values to exceeding the other of the threshold values is less than Δt1. After the Δt1 has elapsed, when the movement component a has exceeded the opposite threshold value from the threshold value Thu or the threshold value Thd, the routine proceeds to step 148, and when the movement component a has exceeded the opposite threshold value from the threshold value Thu or the threshold value Thd prior to Δt1 elapsing, the routine returns to step 142. Note that after the Δt1 has elapsed, if the movement component a has not exceeded the opposite threshold value from the threshold value Thu or the threshold value Thd even though a specific time period has elapsed, the routine returns to step 142.

At step 148, determination is made as to whether or not snap shake has been detected by determining whether or not movement has exceeded predetermined threshold values. Specifically, as shown in FIG. 15A, when determined at step 142 that the movement component a has first exceeded the threshold value Thu, determination is made as to whether or not, subsequently to the movement component a exceeding the threshold value Thu, the movement component a has once again become a value in the specific range after becoming less than the threshold value Thd. Also, as shown in FIG. 15B, when determined at step 142 that the movement component a has first exceeded the threshold value Thd, determination is made as to whether or not, subsequently to the movement component a becoming less than the threshold value Thd, the movement component a has once again become a value in the specific range after exceeding the threshold value Thd. Determination is made that snap shake has occurred when the movement component a has changed in such a manner. When snap shake has been detected, processing proceeds to step 150, and processing returns to step 142 when snap shake is not detected.

At step 150, a period of time from the point in time when movement component a exceeded the threshold value Thu when snap shake was detected at step 148 until the movement component a has once again become a value in the specific range after becoming less than the threshold value Thd, or a period of time from the point in time when movement component a became less than the threshold value Thd when snap shake was detected at step 148 until the movement component a has once again become a value in the specific range after exceeding the threshold value Thu, are computed as a shake duration. The shake duration may be counted with a timer, or may be computed by the number of times of measurement of the movement component a within the shake duration.

Next, at step 152, determination is made as to whether or not the shake duration computed at step 150 a predetermined determination period $\Delta t2$ or longer. When the shake duration is the determination period $\Delta t2$ or longer, processing proceeds to step 154, and the magnitude of movement of snap shake is determined to be "large", However, when the shake duration is smaller than determination period $\Delta t2$, processing proceeds to step 156 and the magnitude of movement of snap shake is determined to be "small". Note that the determination period $\Delta t2$ is set at an appropriate value to prevent incorrect determination occurring due, for example, to placing the electronic device provided with the movement detection device 10 according to the present exemplary embodiment on a desk, or due to vibration from riding in a transport vehicle or the like.

Next, at step 158, the axial direction of movement determined at step 144, the magnitude of movement determined at step 154 or step 156, and the shake duration computed at step 150 are temporarily stored, as snap shake detection results, in a specific storage region.

Note that $\Delta t1$ and $\Delta t2$ set to appropriate periods of time in order to prevent incorrect actuation such as, for example, when walking, when running, or when riding in a vehicle, and are set such that snap shake determination is not made when the waveform cycle of the acceleration component data is slow (when walking or when running: about 4 Hz or less), or fast (limit of snap shake: about 6 Hz or greater).

Figure 14:
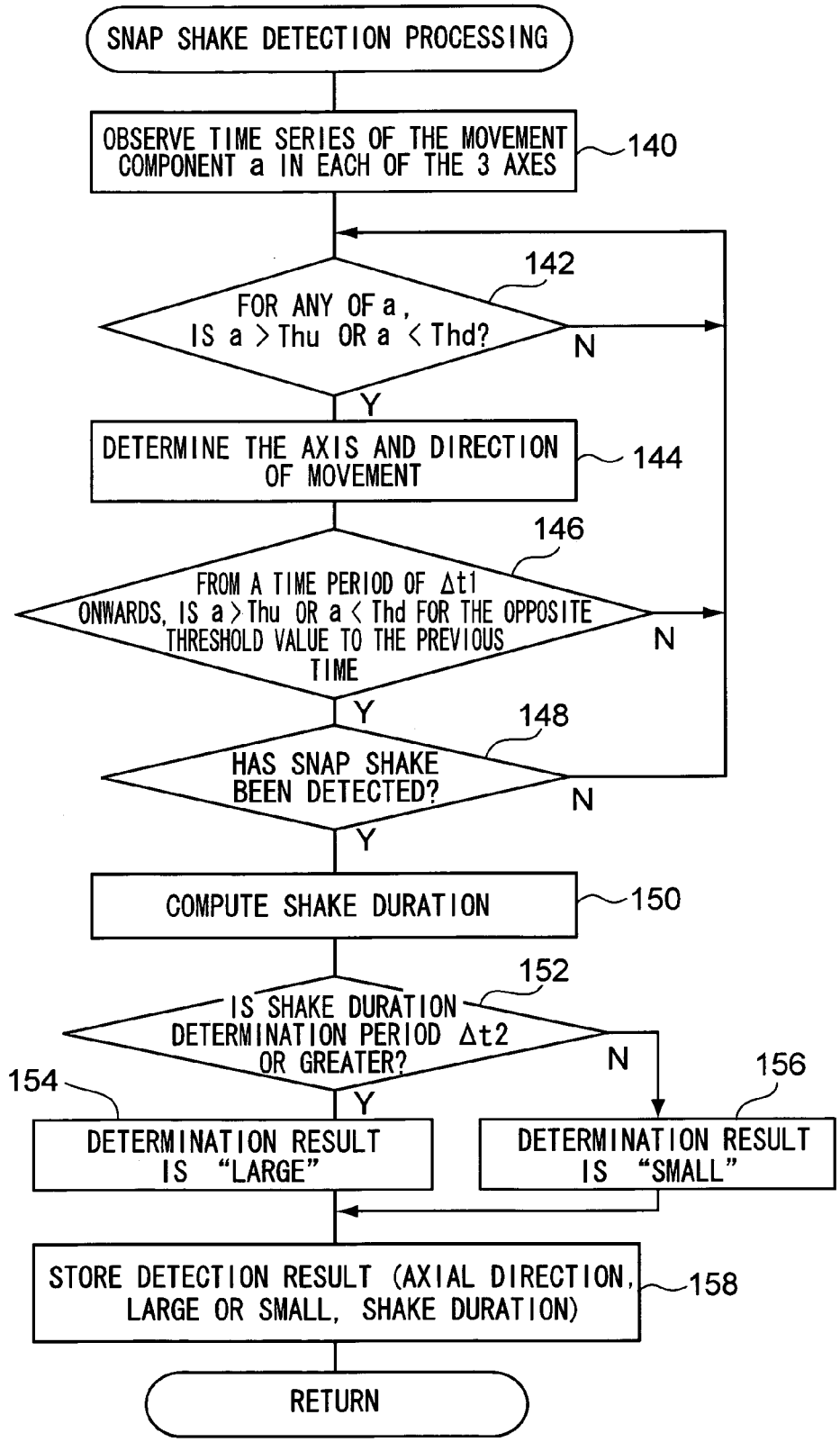
FIG. 14 is a flow chart showing contents of a snap shake detection processing routine in a movement detection device of the first exemplary embodiment.

Next, processing returns to step 104 of FIG. 9, and a detection signal is generated and output based on the detection results stored at step 158 of the snap-shake detection processing (FIG. 14).

For example, explanation follows regarding a case where the movement detection device 10 of the first exemplary embodiment is provided to a mobile phone such that the length direction upward facing is the X axis + direction, downward facing is the X axis − direction, the width direction left facing is the Y axis + direction, right facing is the Y axis − direction, the thickness direction facing away is the Z axis + direction, and facing towards is the Z axis − direction.

Correspondence can be assigned of the contents of various operational inputs against snap shake directions, such as, for example: a small snap shake towards the left with an increase in volume of one step and a large snap shake with an increase in volume of two steps; a small snap shake towards the right direction with a decrease in volume by one step and a large snap shake with a decrease in volume by two steps. Note that while explanation has been given of snap shakes in the left direction and right direction, correspondence may be assigned of operational inputs for each of the axial directions, such that, for example, a snap shake in the up-down direction changes 1seg channel, snap shake forwards or backwards changes the size of the display screen, and the magnitude of snap shake is corresponded against the amount of operation.

Consequently, in the current step, a detection signal according to such correspondence is output. Note that in the first exemplary embodiment, since movement is detected based on the movement components, snap shakes along the axial directions can be detected irrespective of whether the mobile phone is vertically held or horizontally held. For example, when the detection result is a large snap shake in the Y axis + direction, a detection signal is made so as to increase the volume by two steps. Even more detection signals can be output by detecting the axial direction of movement together with the magnitude of movement in this manner, and multiple operational input is enabled by application of the movement detection device 10 of the present exemplary embodiment to motion input or the like.

As explained above, according to the movement detection device of the first exemplary embodiment, data after low-pass filter processing of acceleration component data acquired from the tri-axial acceleration sensor is split into stationary components, and movement components of data in which the stationary component data has been subtracted from the acquired respective acceleration component data. Snap shake is then detected in the direction corresponding to the axis where the movement component in the 3 axes first exceeded the threshold value Thu or first became less than threshold value Thd. In cases where the magnitude of the movement component first exceeded the threshold value Thu, the magnitude of snap shake is detected by detecting the shake duration, as the period of time from the point in time when the movement component exceeded the threshold value Thu up to when the movement component once again became a value in the specific range after becoming less than the threshold value Thd. In cases where the magnitude of the movement component first became less than the threshold value Thd, the magnitude of snap shake is detected by detecting the shake duration as the period of time from the point in time when the movement component became less than the threshold value Thd up to when the movement component once again became a value in the specific range after exceeding the threshold value Thu. Since the magnitude of the movement or snap shake is detected by determining whether or not the shake duration is the determination period $\Delta t2$ or longer, both whether snap shake has occurred in either of the axial directions and the magnitude of such snap shake can be reliably detected by simple processing.

Next, explanation follows regarding a movement detection device 210 of a second exemplary embodiment. In the first exemplary embodiment, explanation has been given of detecting the magnitude of movement in snap shake by comparing the shake duration to a determination period, however, in the second exemplary embodiment, explanation follows of detecting the magnitude of movement in snap shake by employing vector integral values. Note that since the configuration of the movement detection device 210 of the second exemplary embodiment is similar to that of the movement detection device 10 of the first exemplary embodiment, further explanation thereof is omitted.

Figure 16:
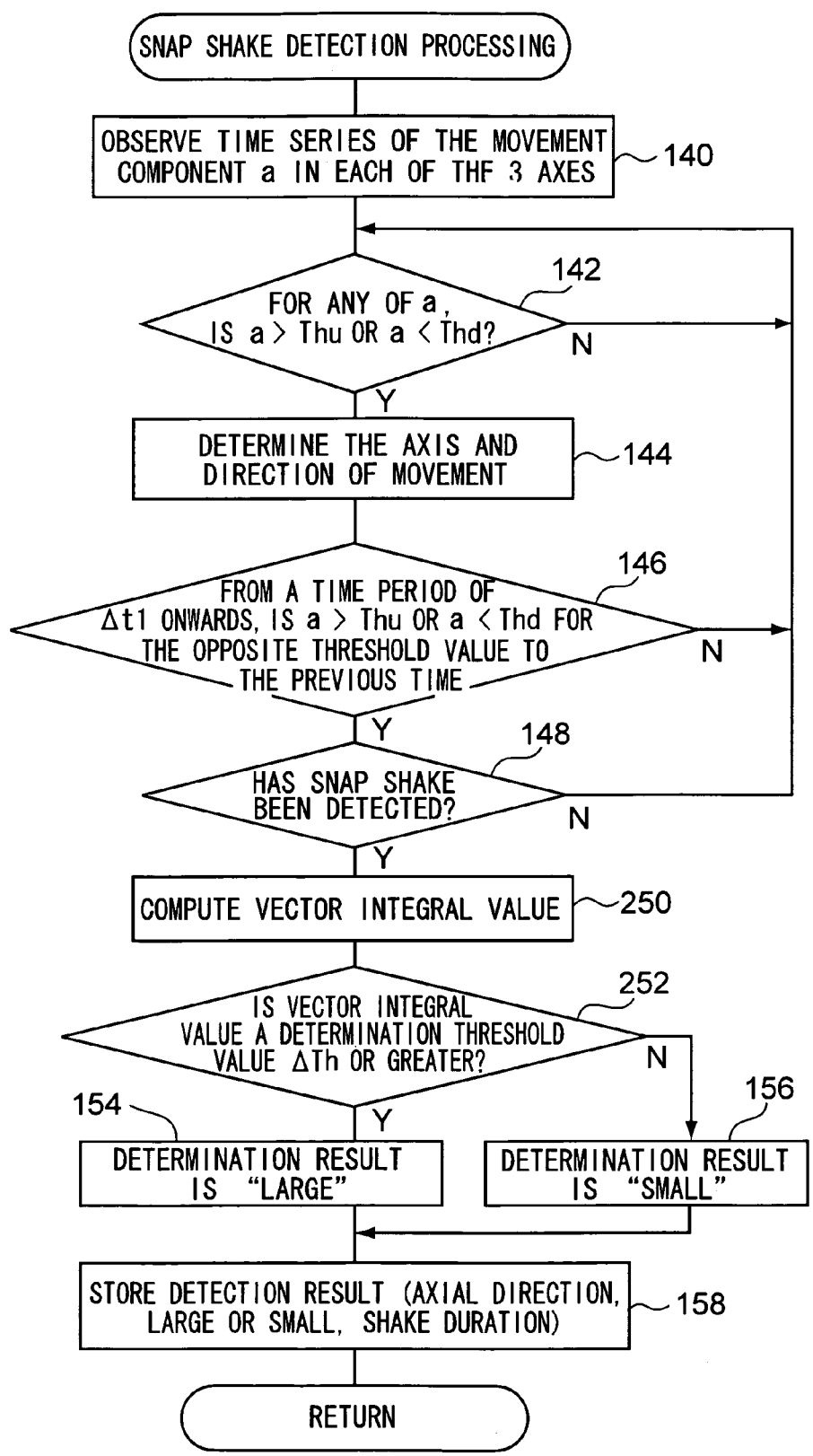
FIG. 16 is a flow chart showing contents of a snap shake detection processing routine in a movement detection device of a second exemplary embodiment.

A movement detection processing routine in the second exemplary embodiment differs from the movement detection processing routine in the first exemplary embodiment in the contents of the snap shake detection processing routine, and so explanation follows regarding the snap shake detection processing routine of the second exemplary embodiment, with reference to FIG. 16. Similar processing to that of the snap shake detection processing of the first exemplary embodiment is allocated the same reference numerals and further explanation is omitted.

Figure 17A:
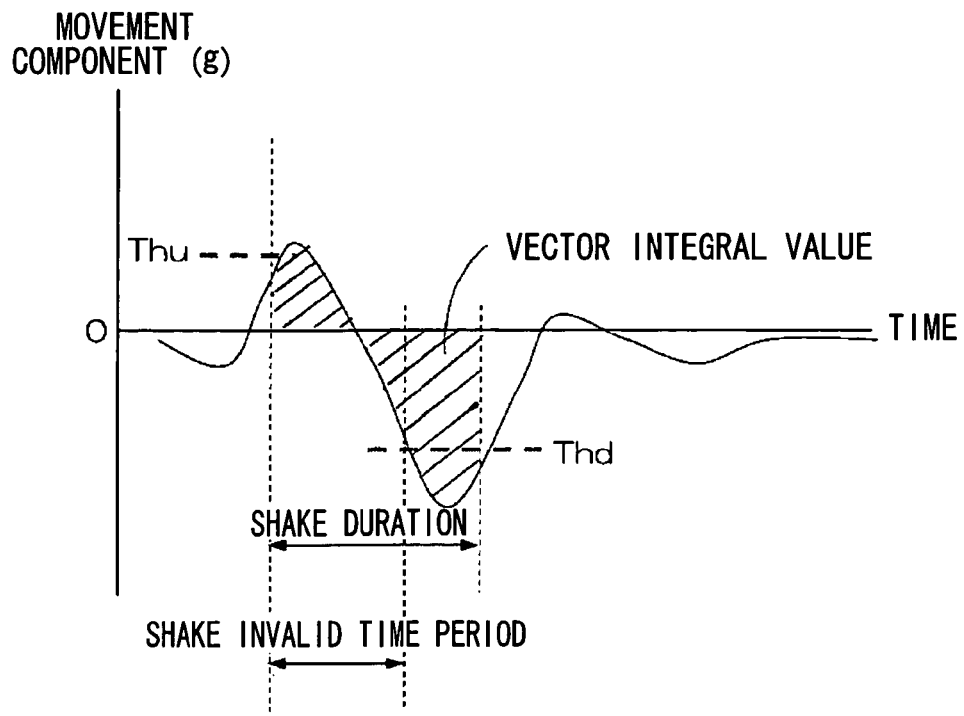
FIGS. 17A and 17B are diagrams for explaining detection of snap shake in the second exemplary embodiment when (FIG. 17A) the movement component has first exceeded the threshold value Thu, and when (FIG. 17B) the movement component has first become less than the threshold value Thd.
Figure 17B:
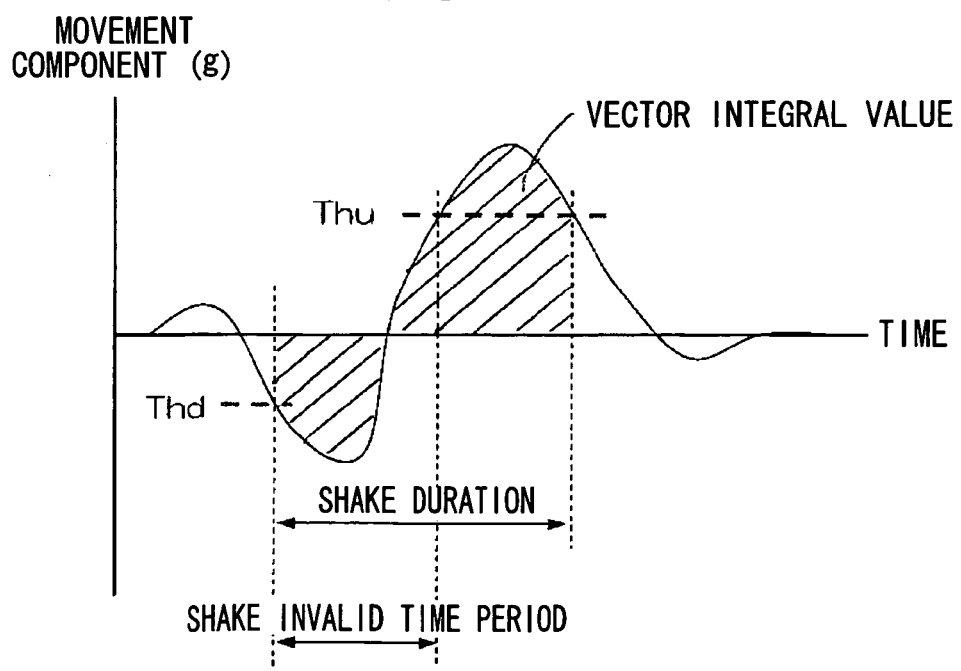

When, through performing the processing of step 140 to step 148, snap shake is detected at step 148, processing proceeds to step 250, and shake duration of the snap shake detected at above step 148 is computed, and an integral value (vector integral value) of the magnitudes of the movement component a detected in the shake duration is computed. The vector integral value is equivalent to the area of the diagonally shaded portions shown in FIG. 17A and FIG. 17B. Note that in FIG. 17A, the movement component a first exceeded the threshold value Thu, and in FIG. 17B the movement component a first became less than the threshold value Thd.

Next, at step 252, determination is made as to whether or not the vector integral value computed at step 250 is the same as or greater than a predetermined determination threshold value ΔTh. When the vector integral value is the same as or greater than the determination threshold value ΔTh, processing proceeds to step 154, and the magnitude of movement of the snap shake is determined to be "large". However, when the vector integral value is less than the determination threshold value ΔTh, processing proceeds to step 156, and determination is made that the magnitude of movement of the snap shake is "small". Note that determination threshold value ΔTh is set to an appropriate value to prevent incorrect determination occurring due to placing the electronic device provided with the movement detection device 210 according to the present exemplary embodiment on a desk or the like, or vibrations from riding in a vehicle or the like.

As explained above, according to the movement detection device of the second exemplary embodiment, data resulting from subjecting acceleration component data acquired from the tri-axial acceleration sensor to low-pass filtering processing is split into stationary components and movement components, of the acquired acceleration component data from which data of the stationary components has been subtracted. Snap shake is detected in the direction of the axis corresponding to the movement component of the three axes that first exceeded the threshold value Thu or became less than the threshold value Thd, and the magnitude of movement of snap shake is detected by whether or not the vector integral value of the movement component a detected over the shake duration is equal to or more than the determination threshold value ΔTh. Consequently, whether or not there has been snap shake in either one of the axial directions and the magnitude of such snap shake can be reliably detected with simple processing.

Explanation now follows regarding a movement detection device 310 of a third exemplary embodiment. While explanation has been given of detecting whether or not there has been movement in either one of the axial directions in the first exemplary embodiment, in the third exemplary embodiment, explanation will be given of detecting movement in the direction of gravity, and of determining if either of the axial directions is a gravitational axis. Note that since the configuration of the movement detection device 310 of the third exemplary embodiment is similar to that of the movement detection device 10 of the first exemplary embodiment, further explanation thereof will be omitted.

Next, explanation follows regarding the operation of the movement detection device 310 of the third exemplary embodiment. In the third exemplary embodiment, the movement detection device 310 is moved in the direction of gravity with one of the faces of the tri-axial acceleration sensor 12 facing down, which face is facing down is detected by determining the direction of gravity, and different detection signals are output according to this determination. Note that in the third exemplary embodiment, moving the movement detection device 310 in the direction of gravity in this manner, with one of the tri-axial acceleration sensor 12 faces facing down, is referred to as "shaking".

Explanation follows regarding the reason the direction of shaking is made the direction of gravity here in the third exemplary embodiment.

Figure 18A:
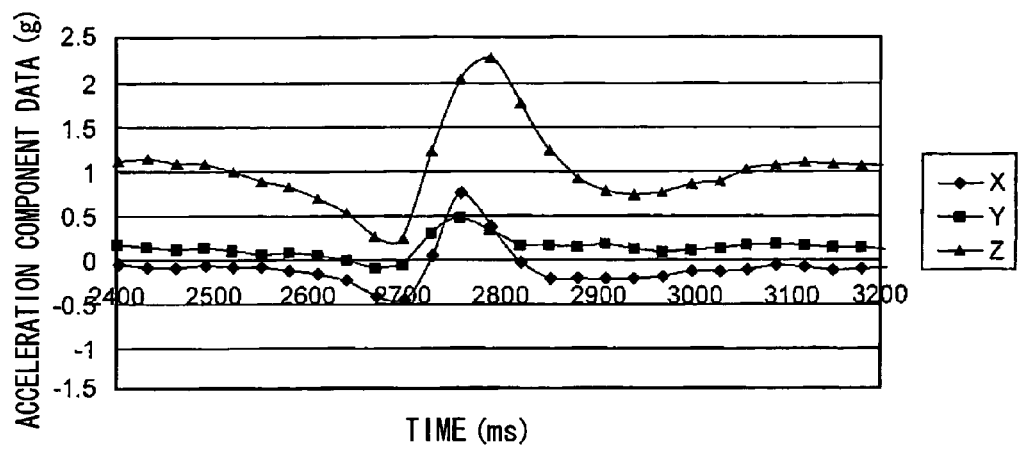
FIG. 18A and FIG. 18B are a diagram showing acceleration component data when a tri-axial acceleration sensor is (FIG. 18A) moved once in the direction of gravity from a horizontal placement state, and (FIG. 18B) is moved once in the horizontal direction.
Figure 18B:
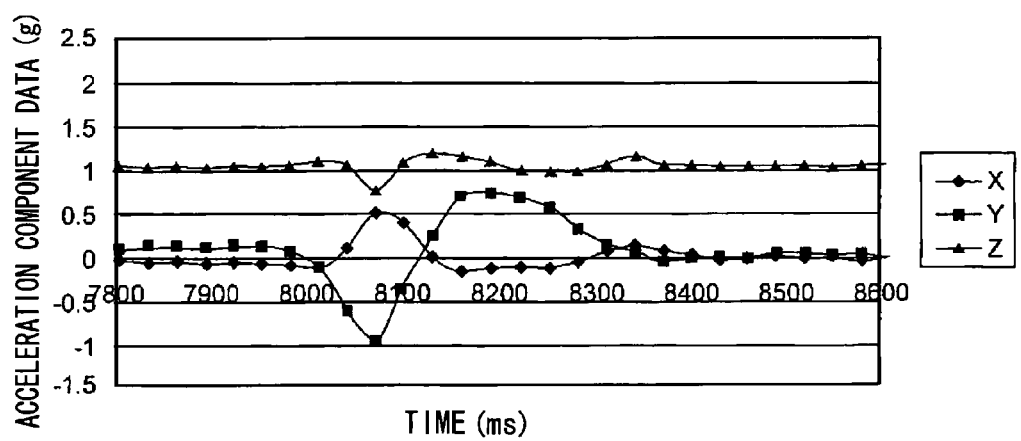

For example, as shown in FIG. 2, in a state in which the tri-axial acceleration sensor 12 is placed horizontally such that the Z axis + direction is in the direction of gravity, namely, in a state in which the acceleration component data for the X axis and the Y axis is "0 g", and the acceleration component data for the Z axis is "+1 g", the acceleration component data for each of the axes when the movement detection device 310 is moved once in the direction of gravity is shown in FIG. 18A, and the acceleration component data for each of the axes when moved once sideways along the Y axis is shown in FIG. 18B. As shown in FIG. 18A, when moved in the direction of gravity, the amplitude of the acceleration component data for the Z axis is greater in comparison to the acceleration component data for the X axis and the Y axis. The value of the acceleration component data also changes more in the + direction. Consequently, it can be determined that the movement detection device 310 was moved in the Z axis + direction.

However, as shown in FIG. 18B, when moved in the Y axis direction, not only in the acceleration component data for the Y axis but a similar level of amplitude is also detected in the acceleration component data of the X axis, albeit with the opposite direction of the amplitude. Therefore, a possibility arises of incorrect determination that the movement detection device 310 was moved in the X axis direction, even though it was actually moved in the Y axis direction.

Therefore, in the third exemplary embodiment it is assumed that movement is in the direction of gravity, this having a high accuracy for the movement direction.

Figure 19:
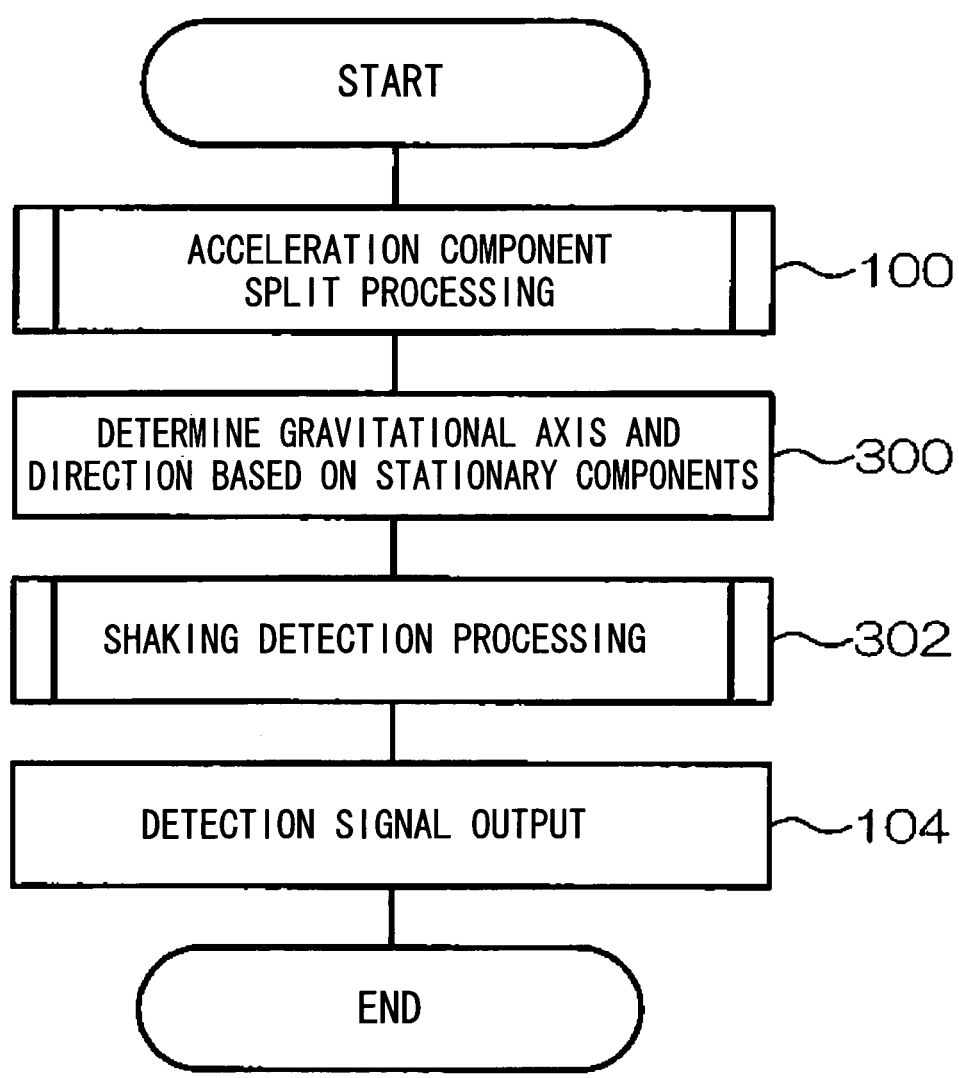
FIG. 19 is a flow chart showing contents of a movement detection processing routine in a movement detection device of a third exemplary embodiment.

Explanation follows regarding a movement detection processing routine in the third exemplary embodiment, with reference to FIG. 19. The current routine is performed by the CPU 20 executing a movement detection program stored in the ROM 22. Note that similar processing to the processing of the movement detection device 10 in the first exemplary embodiment is allocated the same reference numeral and further explanation thereof is omitted.

At step 100, acceleration component split processing is executed. When the movement detection device 310 is in a stationary state with the Z axis + direction in the direction of gravity, the acceleration component data for the X axis and the Y axis is "0 g", and the acceleration component data for Z axis is "+1 g", and it can be determined that the Z axis + direction is in the direction of gravity. However, as shown in FIG. 11, at the locations indicated by S (the outlined locations) in the graph of the moved movement detection device 310, there are plural points where the respective acceleration component data for the three axes indicate values of about the same level, and at these points, sometimes it cannot be determined which of the axes corresponds to the direction of gravity. Therefore, in a similar manner to the acceleration component split processing in the first exemplary embodiment (FIG. 10), the acceleration component data is split into stationary components and movement components.

Figure 10:
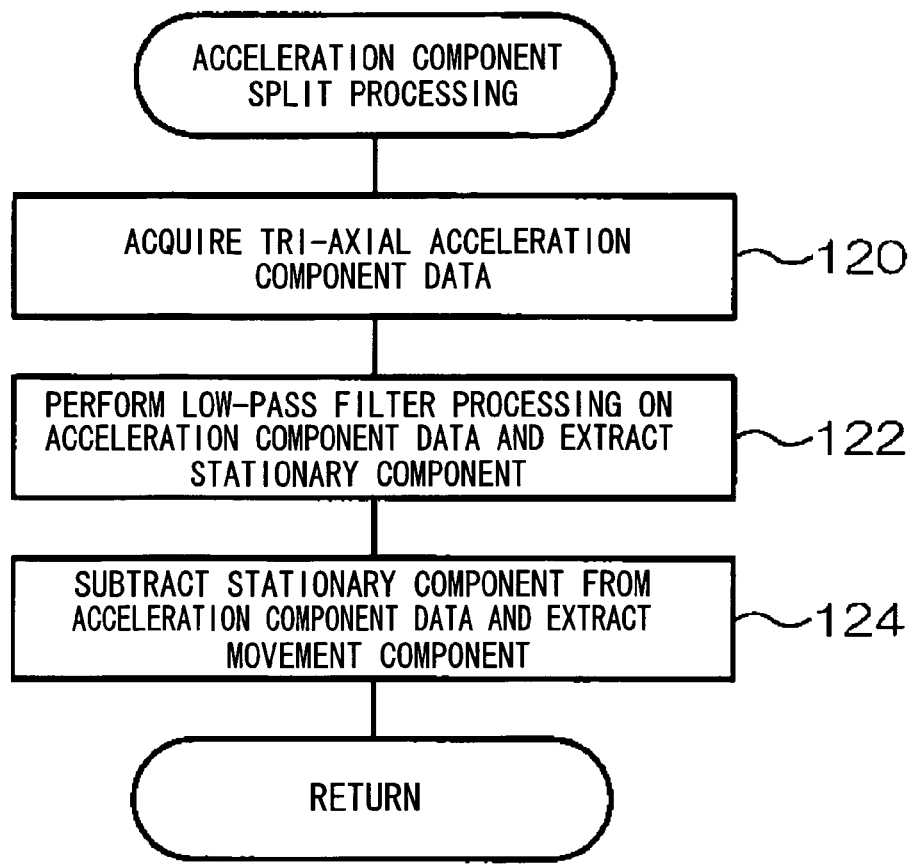
FIG. 10 is a flow chart showing contents of an acceleration separation processing routine in a movement detection device of the first exemplary embodiment.

Next, at step 300, determination is made of the axis and direction corresponding to the direction of gravity (referred to below as the "gravitational axis") based on the stationary component extracted at step 122 of acceleration component split processing (FIG. 10). For example, when a stationary component as shown in FIG. 12 is extracted, due to the stationary component for the Z axis indicating "+1 g", the Z axis + direction is determined to be in the direction of gravity.

Next, at step 302, shaking detection processing is executed to detect, as shaking, movement of a predetermined magnitude or greater. Explanation follows here regarding a shaking detection processing routine, with reference to FIG. 20.

At step 320, observation is commenced of a time series of the movement component a extracted at step 124 in the acceleration component split processing (FIG. 10) for the axis determined to be the gravitational axis at step 300 of FIG. 19.

Figure 21:
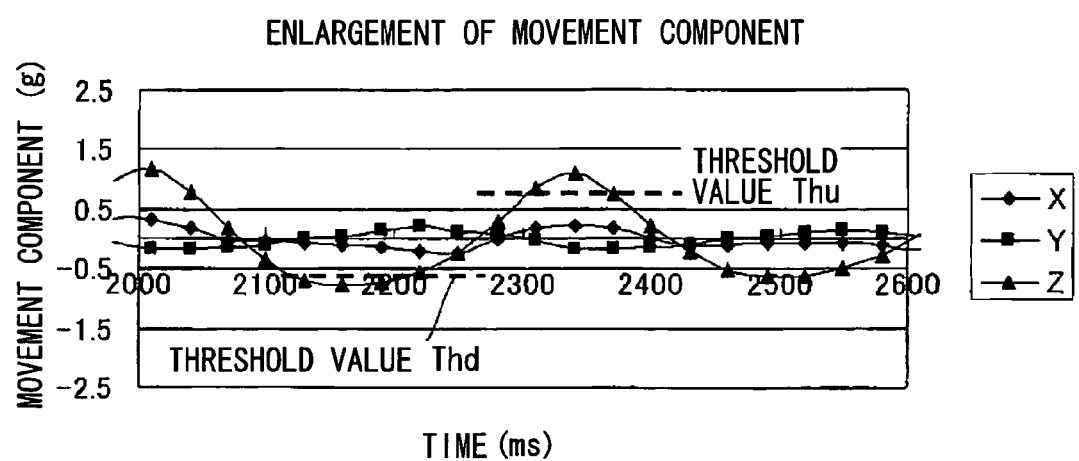
FIG. 21 is a diagram showing movement components, the positive direction threshold value Thu and the negative direction threshold value Thd.

Next, at step 322, determination is made as to whether or not the movement component a in the gravitational axis has exceeded either a predetermined + direction threshold value Thu or a − direction threshold value Thd. FIG. 21 is an enlarged graph of a portion of the variation with time of the movement component a. Values are set for the threshold value Thu and the threshold value Thd so as to detect, as shaking, movement of a predetermined magnitude or greater. The routine proceeds to step 146 when one or other is exceeded, and the current step is repeated when neither is exceeded.

At step 146, determination is made as to whether or not, within a specific time period Δt1 from when determination at above step 322 was made that the movement component a exceeded the threshold value Thu or the threshold value Thd, the opposite threshold value was exceeded from the threshold value Thu or the threshold value Thd to that exceeded the previous time. Note that, similarly to in the first exemplary embodiment, Δt1 is a shake invalid time period for preventing incorrect determination. When the movement component a exceeds the opposite threshold value from the threshold value Thu or the threshold value Thd within Δt1, the routine proceeds to step 148, and the routine returns to step 322 when Δt1 has elapsed without the movement component a exceeding the opposite threshold value from the threshold value Thu or the threshold value Thd.

Next, at step 148 to step 156, shake duration is computed and the magnitude of shaking computed similarly to in the first exemplary embodiment. Then, at step 358, the gravitational axis and direction determined at step 300 of FIG. 19, the magnitude of movement determined at step 154 or at step 156 and the shake duration computed at step 150 are temporarily stored in a specific storage region as shaking detection results.

Figure 20:
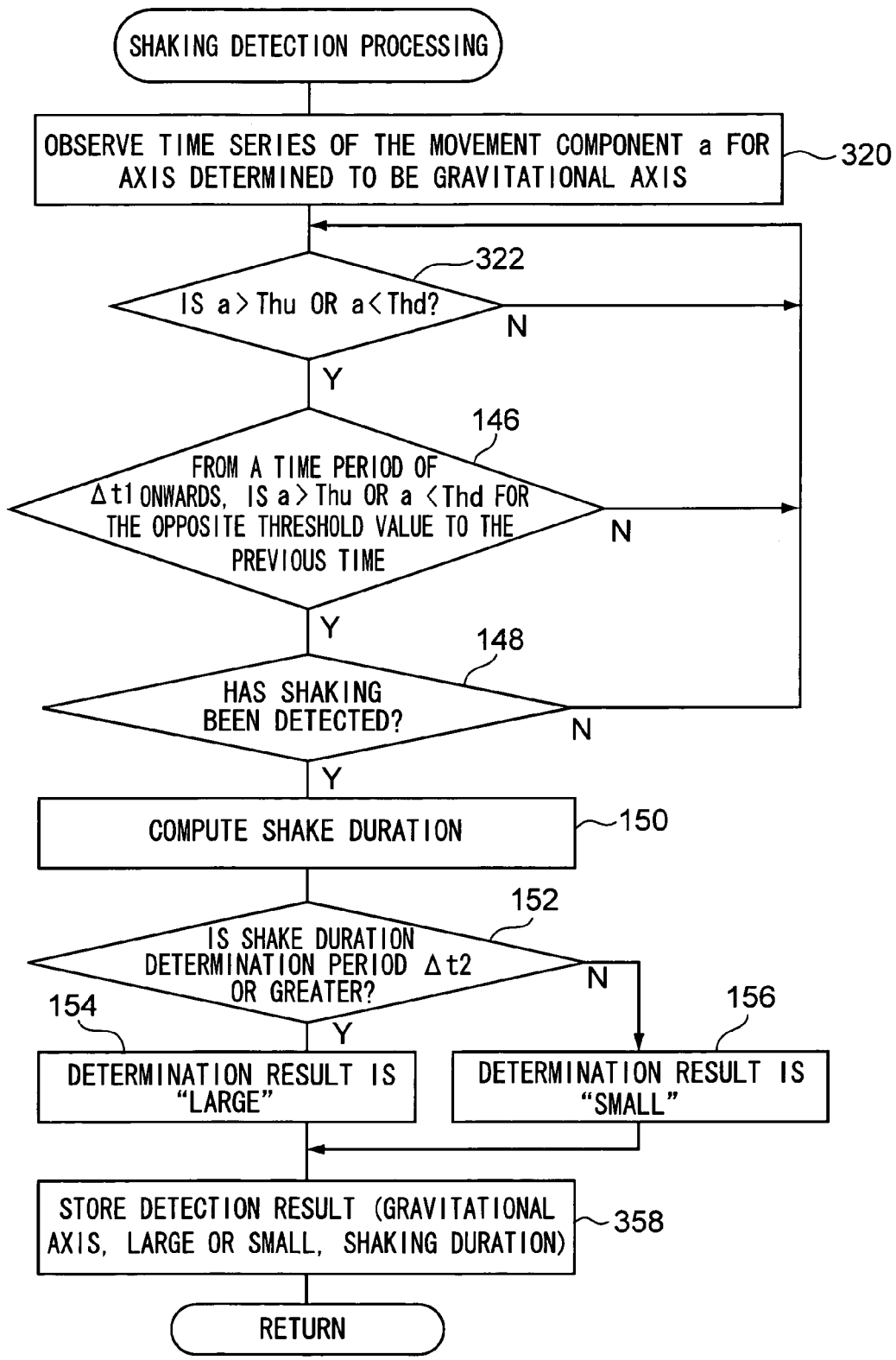
FIG. 20 is a flow chart showing contents of a shaking detection processing routine in a movement detection device of the third exemplary embodiment.

Then, processing returns to step 104 of FIG. 19, and a detection signal is generated and output based on the detection results stored at step 358 of the shaking detection processing (FIG. 20).

For example, when the movement detection device 310 of the third exemplary embodiment is provided to a mobile phone, correspondence can be assigned of the contents of various operational inputs against the axial direction facing downwards when shaking, such as, for example: small shaking when the face corresponding to the Z axis + direction is facing downwards with an increase in volume of one step and large shaking with an increase in volume of two steps; small shaking when the face corresponding to the Z axis − direction is facing downwards with a decrease in volume by one step and large shaking with a decrease in volume by two steps. Note that while explanation has been given of shaking with the face corresponding to the Z axis + direction facing downwards, correspondence may be assigned of operational inputs according to which face is facing downwards, such that, for example, shaking with the X axis + direction or − direction facing downwards changes 1seg channel, shaking with the Y axis + direction or − direction facing downwards changes the size of the display screen, and the magnitude of shaking is corresponded against the amount of operation.

Consequently, in the current step, a detection signal according to such correspondence is output. For example, when the detection result is large shaking when the Z axis + direction is facing downwards, the detection signal is one to increase the volume by two steps. More detection signals can be output by detecting which of axial direction together with the magnitude of shaking in this manner, and multiple operational input is enabled by application of the movement detection device 310 of the present exemplary embodiment to motion input or the like.

As explained above, according to the movement detection device of the third exemplary embodiment, when the movement detection device is moved in the direction of gravity with one face of the movement detection device facing downwards, acceleration component data acquired from the tri-axial acceleration sensor is split into a stationary component obtained by low-pass filter processing and a movement component in which the stationary component has been subtracted from the acquired acceleration component data, the gravitational axis and direction is determined based on the stationary components. Since the magnitude of movement in shaking is detected by determining whether or not the shake duration is the determination period Δt2 or greater, which axial direction is in the direction of gravity and the magnitude of shaking in the direction of gravity can be reliably detected with simple processing.

Note that in the third exemplary embodiment too, the vector integral value over the shake duration may be employed so as to detect the magnitude of shaking, similarly to in the second exemplary embodiment.

Explanation has been given in the first exemplary embodiment to the third exemplary embodiment of determination of whether there is large movement or small movement according to whether or not the shake duration is a determination period or longer, or whether or not the vector integral value over the shake duration is a determination threshold value or greater. However, configuration may be made such that plural determination periods or determination threshold values are set, and the magnitude of movement determined in steps according to which of the determination periods or determination threshold values is exceeded. For example, when determination is made using shake duration, a Δt1 and Δt2 (Δt1<Δt2) may be set as determination periods, and the magnitude of movement determined "small" for shake duration of the Δt1 or less, magnitude determined "medium" for Δt1 to Δt2, and determined "large" for a shake duration of Δt2 or greater. Similar configuration may be made when employing vector integral values.

Note that while explanation was given in the first to the third exemplary embodiments of cases where the tri-axial acceleration sensor and the microcomputer are integrated together, configuration may be made such that only the tri-axial acceleration sensor is provided within the electronic device, and the microcomputer is provided externally to the electronic device.

What is claimed is:

1. A movement detection device, comprising:
an acceleration detection section that detects acceleration for each axis of a three-dimensional orthogonal coordinate system and outputs acceleration component data for each axis; and
a movement detection section that detects a direction of movement along each axis based on the acceleration component data output from the acceleration detection section,
wherein for cases in which the acceleration component data for a given axis exceeds an upper limit value of a specific range encompassing 0 before falling below a lower limit value of the specific range, the movement detection section detects the magnitude of movement based on a first time period from a point in time when the acceleration component data for the given axis exceeded the upper limit value up to a point in time when the acceleration component data for the given axis reaches a value in the specific range after falling below the lower limit value, or based on an integral value of the magnitude of the acceleration component data for the given axis within the first time period,
wherein for cases in which the acceleration component data for the given axis falls below the lower limit value before exceeding the upper limit value, the movement detection section detects the magnitude of movement based on a second time period from a point in time when the acceleration component data for the given axis fell below the lower limit value up to a point in time when the acceleration component data for the given axis reaches a value within the specific range after exceeding the upper limit value, or based on an integral value of the magnitude of the acceleration component data for the given axis within the second time period,
wherein for cases in which the acceleration component data along an axis exceeds, for each axis, the upper limit value of the specific range before falling below the lower limit value thereof, the movement detection section detects a + as the direction of movement, and for cases in which the acceleration component data along an axis falls below, for each axis, the lower limit value of the specific range before exceeding the upper limit value thereof, the movement detection section detects a − as the direction of movement, and
wherein the movement detection section outputs signals expressing the magnitude of the acceleration component data and the + or − direction for each axis.

2. The movement detection device of claim 1, further comprising a splitting section that splits the acceleration component data output for each axis from the acceleration detection section into a stationary component obtained by low-pass filter processing and a movement component, wherein the movement detection section detects acceleration for each axis based on the movement component for that axis.

3. The movement detection device of claim 2, wherein:
the movement detection section determines which of the three axes has the maximum value of the movement component;
for cases in which the maximum value of the movement component has first exceeded the upper limit value before becoming less than the lower limit value, the movement detection section detects movement along the axis with the maximum value of the movement component based on whether a period of time from the point in time when the movement component with the maximum value exceeded the upper limit value up to a point in time when the movement component with the maximum value fell below the lower limit value is longer than a predetermined specific duration; and
for cases in which the maximum value of the movement component has become less than the lower limit value before exceeding the upper limit value, the movement detection section detects movement along the axis with the maximum value of the movement component based on whether a period of time from the point in time when the movement component with the maximum value fell below the lower limit value up to when the movement component with the maximum value exceeded the upper limit value is longer than the predetermined specific duration.

4. The movement detection device of claim 1, further comprising:
a splitting section,
wherein the splitting section splits the acceleration component data output for each axis from the acceleration detection section into a stationary component obtained by low-pass filter processing and a movement component,
wherein the movement detection section detects whether which of the axes is a gravitational axis corresponding to the direction of gravity based on the stationary component when the acceleration detection section has been moved in the direction of gravity with one of the axes facing in the direction of gravity, and
wherein the movement detection section detects the magnitude of movement based on the movement component in the axial direction.

5. The movement detection device of claim 4, wherein:
for cases in which the movement component of the gravitational axis first exceeded the upper limit value before becoming less than the lower limit value, the movement detection section detects movement in the direction of gravity based on whether a period of time from the point in time when the upper limit value was exceeded up to a point in time when the movement component of the gravitational axis became less than the lower limit value is longer than a predetermined specific duration; and
for cases in which the movement component of the gravitational axis became less than the lower limit value before exceeding the upper limit value, the movement detection section detects movement in the direction of gravity based on whether a period of time from the point in time when the movement component of the gravitational axis became less than the lower limit value up to a point in time when the movement component of the gravitational axis exceeded the upper limit value is longer than the predetermined specific duration.

6. The movement detection device of claim 1, wherein the movement detection section detects the magnitude of movement by: comparing the first time period or the second time period against a plurality of predetermined determination periods, and determining whether the first time period or the second time period is longer than one of the plurality of determination periods; or, by comparing the first integral value or the second integral value against a plurality of predetermined determination values, and detecting whether the first integral value or the second integral value is greater than one of the plurality of predetermined determination values.

7. An electronic device comprising the movement detection device of claim 1.

8. A movement detection method comprising:
- detecting acceleration for each axis of a three-dimensional orthogonal coordinate system and outputting acceleration component data for each axis;
- detecting a direction of movement along each axis based on the acceleration component data;
- for cases in which the acceleration component data for a given axis exceeds an upper limit value of a specific range encompassing 0 before falling below a lower limit value of the specific range, detecting the magnitude of movement on a first time period from a point in time when the acceleration component data for the given axis exceeded the upper limit value up to a point in time when the acceleration component data for the given axis reaches a value in the specific range after falling below the lower limit value, or based on an integral value of the magnitude of the acceleration component data within the first time period;
- for cases in which the acceleration component data for the given axis falls below the lower limit value before exceeding the upper limit value, detecting the magnitude of movement based on a second time period from a point in time when the acceleration component data for the given axis became less than the lower limit value up to a point in time when the acceleration component data for the given axis reaches a value within the specific range after exceeding the upper limit value, or based on an integral value of the magnitude of the acceleration component data over the second time period,
- for cases in which the acceleration component data along an axis exceeds, for each axis, the upper limit value of the specific range before falling below the lower limit value thereof, detecting a + as the direction of movement, and for cases in which the acceleration component data along an axis falls below, for each axis, the lower limit value of the specific range before exceeding the upper limit value thereof, detecting a − as the direction of movement; and
- outputting signals expressing the magnitude of the acceleration component data and the + or − direction for each axis.

9. A non-transitory computer-readable storage medium storing a movement detection program that causes a computer to function as:
- an acquisition section that acquires acceleration component data output from an acceleration detection section that detects acceleration for each axis of a three-dimensional orthogonal coordinate system and outputs the acceleration component data for each axis; and
- a movement detection section that detects a direction of the movement along each axis based on acceleration component data output from the acceleration detection section;
- wherein for cases in which the acceleration component data for a given axis exceeds an upper limit value of a specific range encompassing 0 before falling below a lower limit value of the specific range, the movement detection section detects the magnitude of movement based on a first time period from a point in time when the acceleration component data for the given axis exceeded the upper limit value up to a point in time when the acceleration component data for the given axis reaches a value in the specific range after falling below the lower limit value, or based on an integral value of the magnitude of the acceleration component data for the given axis within the first time period,
- wherein for cases in which the acceleration component data for the given axis falls below the lower limit value before exceeding the upper limit value, the movement detection section detects the magnitude of movement based on a second time period from a point in time when the acceleration component data for the given axis fell below the lower limit value up to a point in time when the acceleration component data for the given axis reaches a value within the specific range after exceeding the upper limit value, or based on an integral value of the magnitude of the acceleration component data for the given axis within the second time period,
- wherein for cases in which the acceleration component data along an axis exceeds, for each axis, the upper limit value of the specific range before falling below the lower limit value thereof, the movement detection section detects a + as the direction of movement, and for cases in which the acceleration component data along an axis falls below, for each axis, the lower limit value of the specific range before exceeding the upper limit value thereof, the movement detection section detects a − as the direction of movement, and
- wherein the movement detection section outputs signals expressing the magnitude of the acceleration component data and the + or − direction for each axis.

10. The movement detection device of claim 1, wherein:
the movement detection section determines whether or not the acceleration component data falls below the lower limit value after a specific time period from when the acceleration component data along the axis exceeded the upper limit value, and whether or not the acceleration component data exceeds the upper limit value after the specific time period from when the acceleration component data along the axis falls below the lower limit value.

11. The movement detection device of claim 10, wherein:
an operational input for each axis is compared against the magnitude of acceleration so that as the amount of operation becomes greater, the greater the magnitude of acceleration component data becomes, for each axis.

12. The movement detection device of claim 11, wherein:
the operational inputs are assigned to respective axial directions and include volume operation, changing of channel, and changing the size of a display screen.

* * * * *